US012182024B2

(12) United States Patent
Balasubramani et al.

(10) Patent No.: US 12,182,024 B2
(45) Date of Patent: *Dec. 31, 2024

(54) LATENCY REDUCTION USING STREAM CACHE

(71) Applicant: Micron Technology, Inc., Boise, ID (US)

(72) Inventors: Muthazhagan Balasubramani, Singapore (SG); Venkatesh Anandpadmanabhan, Singapore (SG)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,141

(22) Filed: Nov. 13, 2023

(65) Prior Publication Data

US 2024/0086330 A1 Mar. 14, 2024

Related U.S. Application Data

(63) Continuation of application No. 17/557,406, filed on Dec. 21, 2021, now Pat. No. 11,816,035.

(51) Int. Cl.
*G06F 12/0862* (2016.01)

(52) U.S. Cl.
CPC .. *G06F 12/0862* (2013.01); *G06F 2212/1024* (2013.01); *G06F 2212/6022* (2013.01)

(58) Field of Classification Search
CPC ......... G06F 12/0862; G06F 2212/1024; G06F 2212/6022
See application file for complete search history.

(56) References Cited

U.S. PATENT DOCUMENTS

| | | | |
|---|---|---|---|
| 11,093,174 | B1 | 8/2021 | Jang et al. |
| 2019/0294350 | A1 | 9/2019 | Hahn et al. |

*Primary Examiner* — Jane W Benner
(74) *Attorney, Agent, or Firm* — LOWENSTEIN SANDLER LLP

(57) ABSTRACT

A system and method for a memory sub-system to reduce latency by prefetching data blocks and preloading them into host memory of a host system. An example system including a memory device and a processing device, operatively coupled with the memory device, to perform operations including: receiving a request of a host system to access a data block in the memory device; determining the data block stored in a first buffer in host memory is related to a set of one or more data blocks stored at the memory device; and storing the set of one or more data blocks in a second buffer in the host memory, wherein the first buffer is controlled by the host system and the second buffer is controlled by a memory sub-system.

20 Claims, 5 Drawing Sheets

400

Receiving a request of a host system to access a data block in the memory device
410

Storing the data block in host memory of the host system in response to the request of the host system
420

Transmitting a response to the host system that indicates the data block is stored in a first buffer in host memory
430

Determining that the data block is related to a set of one or more data blocks stored at the memory device
440

Storing the set of one or more data blocks in a second buffer in the host memory without receiving a request from the host system for any of the data blocks in the set, wherein the first buffer is controlled by the host system and the second buffer is controlled by a memory sub-system
450

LATENCY REDUCTION USING STREAM CACHE

RELATED APPLICATIONS

This application is a continuation application of U.S. patent application Ser. No. 17/557,406, filed Dec. 21, 2021, which is incorporated herein by reference.

TECHNICAL FIELD

Embodiments of the disclosure relate generally to memory sub-systems, and more specifically, to memory sub-systems that prefetch data and load the prefetched data into host memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
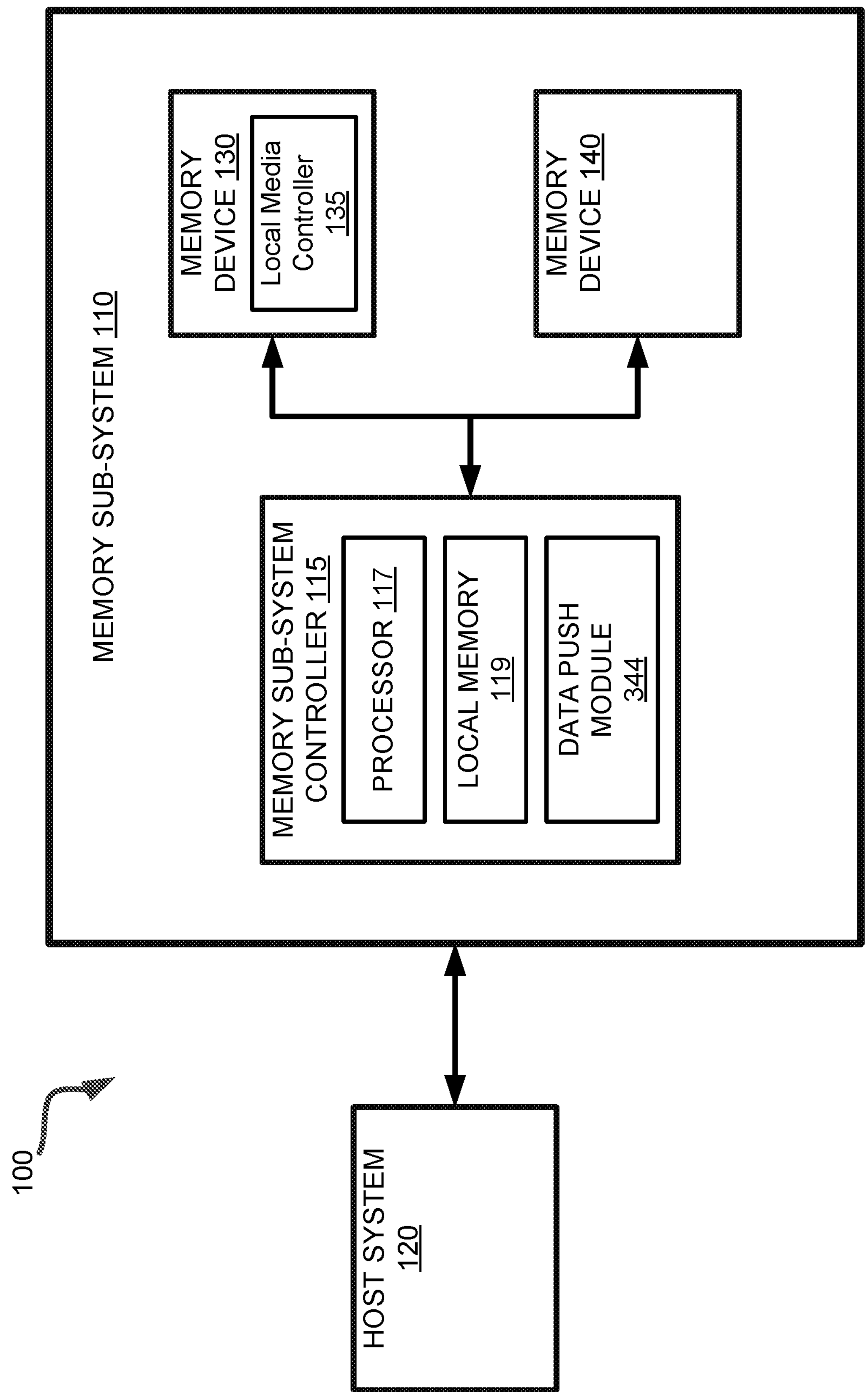
FIG. 1 illustrates an example computing system that includes a memory sub-system and a host system, in accordance with some embodiments of the present disclosure.

Aspects of the present disclosure are directed to memory sub-systems that prefetch data and can load the prefetched data into host memory without waiting for the data to be requested by the host system. The memory sub-system can be a storage device, a memory module, or a combination of a storage device and memory module. Examples of storage devices and memory modules are described below in conjunction with FIG. 1. In general, a host system can utilize a memory sub-system that includes one or more memory devices to store data. The host system can provide data to be stored by the memory devices of the memory sub-system and can request data to be retrieved from the memory devices of the memory sub-system.

The host system can request particular data blocks and temporarily store them in host memory to enable the data to be accessed more quickly. The host memory can be managed by a host system and function as a primary storage (e.g., main memory). The host memory can include regions that are allocated for use by running processes and one or more regions that are used as a buffer to store data blocks retrieved from the memory sub-system (e.g., page cache). The host system can control the buffer and can determine when to request data blocks and where in the buffer to store the requested data blocks. The host system can request a particular data block from the memory sub-system in response to a running process attempting to access the particular data block. Requesting each of the data blocks after the access is attempted is inefficient and leads to increased latency and poor quality of service. Accordingly, retrieving one or more related data blocks before the access is attempted is often preferred. But this is challenging for the host system to do well because the host system is busy managing a lot of tasks and the information available to the host system at the time the data is being accessed may be limited.

Aspects of the present disclosure address the above and other deficiencies by providing technology that enables a memory sub-system to prefetch data blocks using information available at the time the data blocks are written and to manage the preloading of the data blocks into the host memory of the host system. In one example, a memory sub-system can receive a request from a host system that identifies one or more data blocks stored by the memory sub-system. The memory sub-system can access the requested data blocks from one or more memory devices and store the data blocks in a first buffer in host memory (e.g., page cache). The memory sub-system can then send a response to the host system to indicate the requested data block is available in host memory. The memory sub-system can also determine that the requested data block is related to a set of one or more data blocks. The determination can be based on metadata available to the memory sub-system and the metadata can be acquired or determined when the requested data block was written, read, or modified. In one example, the metadata can be relationship data provided by the host system in a write request and can include a stream identifier (StreamID) as defined by the Non-Volatile Memory Express (NVM Express™) specification.

The memory sub-system can then prefetch and preload the set of related data blocks without them being requested by the host system. The prefetching can involve the memory sub-system copying the related data blocks from one or more persistent memory devices (e.g. NAND devices) and storing the data blocks in non-persistent memory (e.g., DRAM, SRAM) of the memory sub-system. The memory sub-system can then preload the prefetched data blocks into a second buffer in the host memory. The second buffer can be controlled by the memory sub-system and may be the same or similar to the first buffer, which is controlled by the host system. The second buffer can be established by the host system, by the memory sub-system, or a combination thereof. In one example, the second buffer can be the same or similar to a Host Memory Buffer (HMB) as defined by the NVM Express (NVMe) specification and can be referred to as a stream cache when it stores data blocks that were identified using stream identifiers (e.g., NVMe StreamID).

Advantages of the technology disclosed herein include, but are not limited to, reducing the latency, and improving the throughput, and efficiency of a host system that is accessing data stored by a memory sub-system. In one example, the technology can enable the host system and the memory sub-system to both manage the loading of data into host memory. Traditional host systems initiate and manage the loading of data into host memory using a pull technique. The pull technique involves the host system requesting particular data blocks and allocating the space in host memory to store the data blocks. The technology disclosed herein provides a push technique that enables the memory sub-system to initiate and manage the loading of data blocks by identifying the data blocks and allocating the space in the host memory to store the data blocks.

In another example, the technology can also or alternatively reduce the amount of Input/Output (IO) between the host system and the memory sub-system (e.g., reduce quantity of requests and responses). This may occur because the memory sub-system can load data blocks in host memory before the host system detects that the data blocks should be accessed from the memory sub-system. Therefore, the host system can retrieve the data blocks from host memory and avoid sending requests to the memory sub-system or waiting for responses from the memory sub-system.

In another example, the technology can enable memory sub-systems to prefetch more data. Traditional memory sub-systems can prefetch data from non-volatile memory (e.g., NAND) and store it in volatile memory of the memory sub-system before receiving the request for the data from the host system. The volatile memory (e.g, DRAM, SRAM) can be referred to as controller memory and the quantity of controller memory is typically much less than the quantity of host memory. The technology disclosed herein can enable the memory sub-system to push the prefetched data into host memory (e.g., the second buffer) so that the amount of prefetched data can far exceed the amount of controller memory.

The technology disclosed herein can be particularly advantageous for low queue depth workloads. A low-queue depth workload is a workload that can be processed by a host system while retaining a queue of outstanding access operations that remains low. A low number of outstanding access operations means that there is less opportunity for the host system and memory sub-system to group the access operations. This results in a larger ratio of read requests to the data read as a result of the read requests, which indicates the processing of access operations is less efficient. This technology is advantageous because the access operations can be processed using data that is preloaded into host memory and reduces the number of read requests transmitted between the host system and memory sub-system.

FIG. 1 illustrates an example computing system 100 that includes a memory sub-system 110 and a host system 120 in accordance with some embodiments of the present disclosure. The memory sub-system 110 can include media, such as one or more non-volatile memory devices (e.g., memory device 130), one or more volatile memory devices (e.g., memory device 140), or a combination of such. Each memory device 130 or 140 can be one or more memory component(s).

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (O×RAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for memory management within the same memory device package. An example of a managed memory device is a managed NAND (MNAND) device.

The memory sub-system 110 can include a data push module 344 that enables memory sub-system 110 to prefetch data and to push the prefetched data into host memory of host system 120. Data push module 344 and data push 238 are discussed in more details below in regards to FIGS. 2-3.

Figure 2:
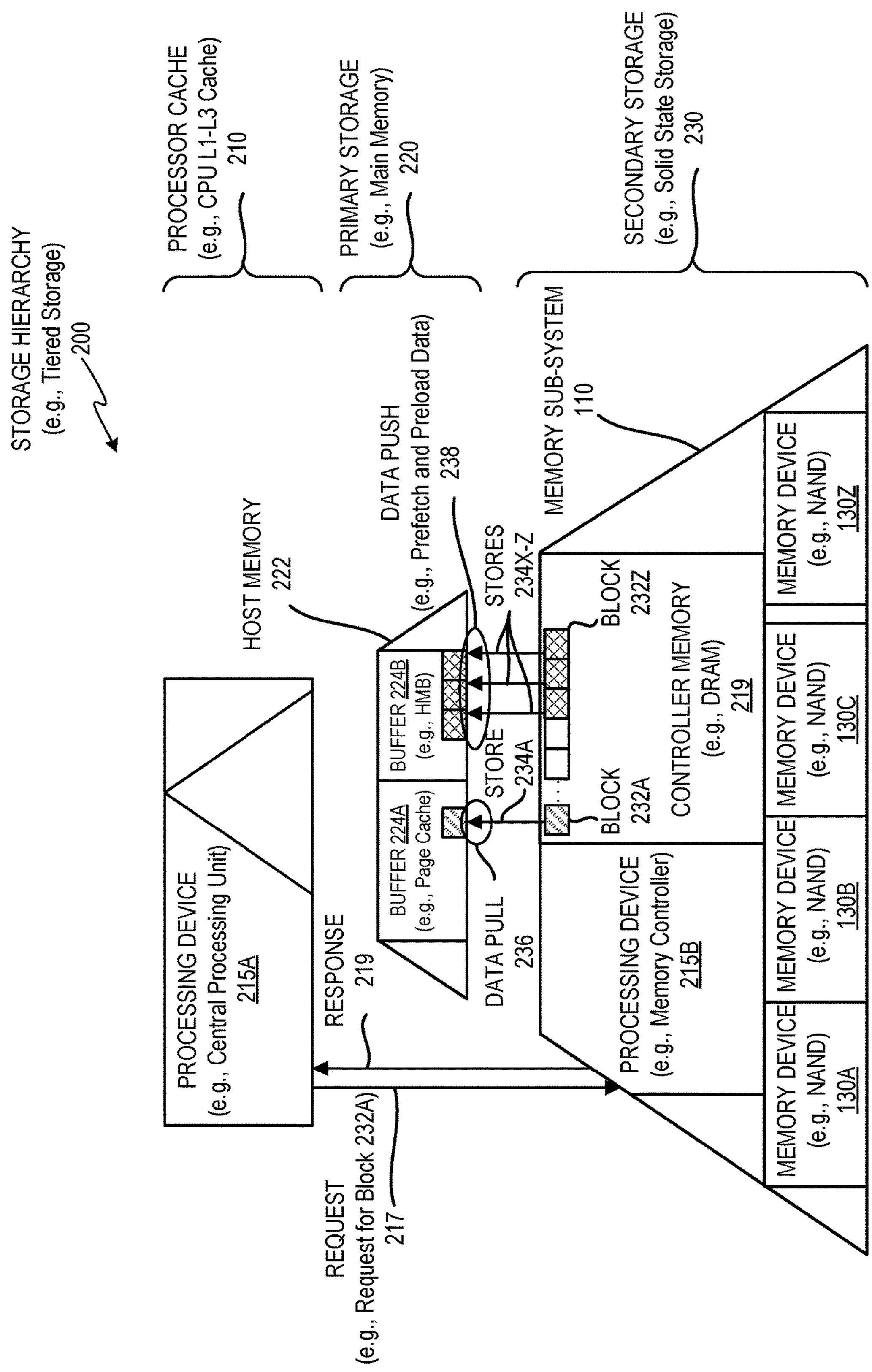
FIG. 2 is a detailed block diagram of a storage hierarchy that includes the memory sub-system that fetches data blocks and loads them into host memory, in accordance with some embodiments of the present disclosure.

FIG. 2 is a block diagram illustrating an exemplary storage hierarchy 200 for host system 120, in accordance with some embodiments of the present disclosure. In the example shown in FIG. 2, a storage hierarchy 200 can be managed by processing devices 215A-B and can include a processor cache 210, a primary storage 220, and a secondary storage 230.

Processing devices 215A-B can communicate with one another to move data within storage hierarchy 200. Processing device 215A can be the primary processor of host system 120 and can manage the operations of host system 120. Processing device 215A can be or include one or more central processing units (CPUs), graphical processing units (GPUs), data processing units (DPUs), tensor processing units (TPUs), digital signal processors (DSPs), application specific integrated circuits (ASICs), field programmable gate arrays (FPGAs), microprocessors, controllers, micro-controllers, quantum processors, other processing unit, or a combination thereof. Processing device 215B can be an auxiliary processor and can manage one or more levels of the storage hierarchy 200 and be the same or similar to a storage controller, memory controller, or a combination thereof. In the example illustrated in FIG. 2, processing device 215A can be a central processing unit (CPU) that is included in host system 120 and processing device 215B can be a memory controller that is included in memory sub-system 110. For example, processing device 215B can be one representation of processor 117 of FIG. 1.

Storage hierarchy 200 can be tiered storage that includes multiple levels of data storage. The levels of storage hierarchy 200 can be the same or similar to tiers, layers, caches, or a combination thereof. The levels that are closer to processing device 215A are "closer levels" and ones that are farther from processing device 215A are "farther levels." In one example, storage hierarchy 200 can be a memory hierarchy and some or all of the layers of storage hierarchy 200 can include memory devices (e.g., SRAM, DRAM, NAND). Each of the multiple levels can be separated into additional levels, can be combined into a single level, or a combination thereof. In the example illustrated in FIG. 2, the closest level can be processor cache 210.

Processor cache 210 can include one or more cache levels for processing device 215A (e.g., CPU cache or GPU cache). In one example, processor cache 210 can include cache level 1 (L1 cache), cache level 2 (L2 cache), cache level 3 (L3 cache), cache level 4 (L4 cache), cache level n (where n is an integer value), other cache level, or a combination thereof. One or more of the cache levels can be included on processing device 215A, off processing device 215A, or a combination thereof (e.g., L1-3 on processor and L4 off processor).

Primary storage 220 can be another level of storage hierarchy 200 and can include host memory 222. Primary storage 220 can be referred to as a closer level, as one of the closer levels, or as an intermediate level. Host memory 222 can function as the main memory of host system 120 and can include Random Access Memory (RAM) that is made of volatile memory (e.g., Dynamic RAM (DRAM)), non-volatile memory (Non-Volatile RAM (NVRAM), Persistent Memory (PMEM)), or a combination thereof. Host memory 222 can be separated in one or more regions of memory that are the same size or different sizes. The regions of memory can be used as buffers and a first region can include buffer 224A and a second region can include buffer 224B.

Buffers 224A-B can each be a portion of data storage that is used to store data while the data is being accessed. Accessing the data can involve reading data, writing data, copying data, moving data, transmitting data, removing data, replacing data, modifying data, other data operation, or a combination thereof. The data stored in buffers 224A-B can originate from a farther level of storage hierarchy 200, a closer level of storage hierarchy 200, or a combination thereof. Each of buffers 224A-B can be located in host memory 222 at one or more physical locations, virtual locations, logical locations, or a combination thereof. In one example, a buffer can be the same or similar to one or more data stores, data caches, data queues, data pages, data files, data records, other data structure, or a combination thereof. In one example, buffer 224A can be a page cache (e.g., host system page cache) and buffer 224B can also be a page cache (e.g., memory sub-system page cache, stream cache, and/or Host Memory Buffer (HMB)), which are discussed in more detail below in regards to FIG. 3.

Buffers 224A-B can be controlled by host system 120, by memory sub-system 110, or a combination thereof. As shown in FIG. 2, buffer 224A can be a first region in host memory 222 and be managed and controlled by host system 120 and buffer 224B can be a second region in host memory 222 and be managed and controlled by memory sub-system 110. Host system 120 can initially control both regions and can communicate with memory sub-system 110 to assign control of the second region to memory sub-system 110. Assigning control can involve assigning partial control to memory sub-system 110 in which host system 120 retains some privileges (e.g., read but does not write) or full control to memory sub-system 110 in which host system 120 retains no access privileges (e.g., does not read or write). In one example, buffer 224A is controlled by host system 120 and stores data that was explicitly requested by host system 120 and buffer 224B is controlled by memory sub-system 110 and stores data that was requested by memory sub-system 110 and may not have been requested by host system 120. Both buffer 224A and 224B can temporarily store (e.g., ephemerally store) data that is persistently stored by secondary storage 230.

Secondary storage 230 can be a another level of storage hierarchy 200 and can include one or more memory sub-systems 110. Secondary storage 230 is one of the farther levels and can be the farthest level when the storage hierarchy is absent tertiary storage (e.g., absent a fourth storage level). Memory sub-system 110 can include one or more memory devices 130A-C, which are the same or similar to memory device 130 of FIG. 1. Secondary storage 230 can persistently store data in memory devices 130A-C and access the data as blocks 232A-Z.

Blocks 232A-Z are units of data storage and can be the units in which processing device 215A-B manage data stored in storage hierarchy 200. A block can be any physical data storage, logical data storage, or virtual data storage used for storing, organizing, or accessing data. A block can include a contiguous or non-contiguous sequence of bytes or bits and can be referred to as a data block, storage block, memory block, memory page, page frame, other term, or a combination thereof. Blocks 232A-Z can have a block size that is the same throughout the storage hierarchy or that changes between levels of the storage hierarchy. For example, the size of the blocks can get smaller or larger in the levels closer to the processor cores. The block size may be a fixed-size, such as a particular integer value (e.g., 4 KiB or 4 KB,) or may be a variable-size that varies within a range of integer values. Each of the blocks 232A-Z can have the same block size or a different block size compared to an adjacent block in the same level of storage hierarchy 200.

Request 217 and response 219 can be messages or signals that are used to communicate between processing devices 215A-B. Request 217 and response 219 can be transmitted over an interconnect (e.g., PCIe bus) and each is sent from one processing device and received by at least one other processing device. The message can include data of one or more commands, instructions, operations, opcodes, micro-code, parameters, input, output, metadata, user data, or a combination thereof. In the example illustrated, request 217 (e.g., read request or write request) is sent from processing device 215A and received by processing device 215B and response 219 (e.g., read response or write request) is sent from processing device 215B and received by processing device 215B.

Request 217 can be a request corresponding to one or more particular blocks of data. The request can be a request to access the one or more particular blocks of data and can be referred to as an access request. An access request can be a read request, a write request, or a combination thereof. Request 217 can include identification data that can be used by the recipient processing device 215B to identify a portion of data being requested. The identification data can be the same or similar to location data and can indicate a source location for the request (e.g., location to be read from), a destination location for the request (e.g., location to be loaded into), or a combination thereof. The identification data or location data can be used to identify a particular block (e.g., data block) and include one or more identifiers, addresses, or offsets that are logical (e.g., Logical Block Addresses (LBAs), physical (e.g., physical addresses), virtual (e.g., virtual addresses), or a combination thereof. In the example shown in FIG. 2, request 217 can be sent by processing device 215A (e.g., CPU) to processing device 215B (e.g., SSD controller) and can request block 232A. Processing device 215B can retrieve block 232A from one or more of memory devices 130A-Z and store it in host memory 222 and send response 219 to processing device 215A.

Response 219 can indicate whether block 232A was successfully retrieved from one or more of memory devices 130A-Z and available to be accessed by processing device 215A. In the example illustrated, response 219 can indicate block 232A is stored in host memory 222 and be sent before, during, or after storing data block 232A in host memory 222. In another example (not shown), response 219 can include the data of data block 232A and processing device 215A can store it in processor cache 210A. In either example, response 219 can be a message or signal that includes status data (e.g., error message), location data (e.g., storage destination), other data, or a combination thereof. Request 217 and response 219 can be associated with one or more data stores 234A-Z.

Stores 234A-Z are data storage operations that store data in one or more levels of storage hierarchy 200. Storing data can involve transmitting data of a source location to a destination location and can include one or more operations to read, write, load, store, persist, move, copy, format, encode, decode, encrypt, decrypt, other operation, or a combination thereof. In the example illustrated by FIG. 2, memory sub-system 110 can include controller memory 219 (e.g., DRAM) and data blocks 232A-Z can be read from one or more of memory devices 130A-Z and into controller memory 219. Stores 234A-Z can then transmit blocks 232A-Z from controller memory 219 to host memory 222. In another example, memory sub-system 110 can be absent DRAM (not shown) and stores 234A-Z can transmit blocks 232A-Z from memory devices 130A-Z to host memory 222. In either example, stores 234A-Z can directly transmit or indirectly transmit data blocks 232A-Z to or from host memory 222.

Directly transmitting a data block can involve transmitting the data block from memory sub-system 110 to host memory 222 without transmitting the data block to processing device 215A (e.g,. bypassing the CPU). This can be accomplished using Direct Memory Access (DMA). Indirectly transmitting the data block can involve transmitting the data block from memory sub-system 110 to host memory 222 by transmitting the data block through processing device 215A (e.g., to CPU and then from CPU to host memory). A data storage operation of stores 234A-Z can be destructive operations (e.g., write), non-destructive operations (e.g., read, load), or a combination thereof. Stores 234A-Z can include data storage operations that are requested by processing device 215A (e.g., data pull 236), by processing device 215B (e.g., data push 238), other device, or a combination thereof.

Data pull 236 and data push 238 can both involve moving data between levels of storage hierarchy 200 and data pulls can be explicitly requested and managed by processing device 215A (e.g., CPU) and data pushes can be managed by another processing device (e.g., SSD controller) without being explicitly requested by processing device 215A. Explicitly requesting data can involve requesting particular blocks of data be moved and can involve processing device 215A sending one or more requests for those particular blocks. Moving the data blocks can involve moving the data to be closer or farther away from processing device 215A (e.g., CPU). Moving data blocks closer can involve transferring (e.g., reading, loading) a data block from a farther level to a closer level of the storage hierarchy and be referred to as a downstream operation (e.g., downstream store, transfer, or move). Moving data bocks farther away from processing device 215A can involve transferring (e.g. writing, persisting) a data block from a closer level to a farther level of the storage hierarchy and be referred to as an upstream operation (e.g., upstream store, transfer, or move). Data pushes and data pulls can both be used to move data closer, farther, or a combination thereof.

Data pushes can be advantageous because the movement of data can occur without processing device 215A managing the moves (e.g., initiating the store operations). For example, data push 238 can involve moving data between levels of storage hierarchy 200 without being explicitly requested by processing device 215A. In the example illustrated in FIG. 2, data pull 236 can involve store 234A and occur in response to processing device 215A transmitting request 217 that identifies block 232A. Data push 238 can involve stores 234X-Z and occur in the absence of a request by processing device 215A. Data push 238 can involve the memory controller of memory sub-system 110 prefetching data blocks 232X-Z from memory devices 130A-Z and into controller memory 219 and then preloading the prefetched data blocks into buffer 224B in host memory using stores 234X-Z. Data blocks 232X-Z can be stored in buffer 224B instead of buffer 224A because the data push is managed by processing device 999B, which controls buffer 224B and can make space available in buffer 224B to store the pushed data blocks 232X-Z. The buffer 224B can be larger than controller memory 219 and preloading the data into buffer 224B can enable prefetching more data than can fit in controller memory 219. The processes of determining when, where, and what data blocks to be pushed is discussed in more detail below in regards to FIG. 3.

Figure 3:
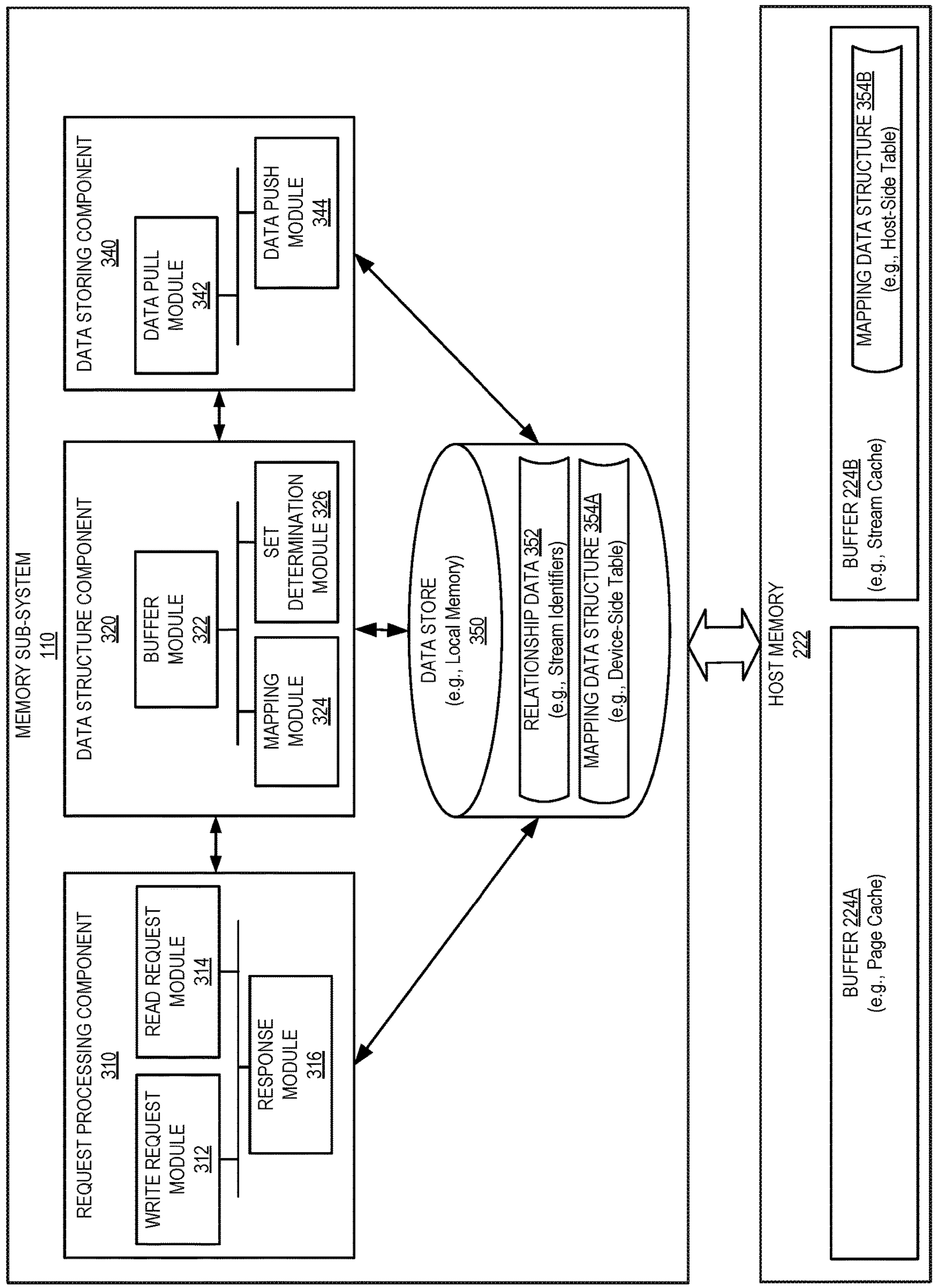
FIG. 3 is a detailed block diagram of the memory sub-system of FIGS. 1-2 with technology for prefetching data blocks and loading them into host memory, in accordance with some embodiments of the present disclosure.

FIG. 3 is a block diagram illustrating an exemplary memory sub-system 110 that includes technology for prefetching data blocks and loading them into host memory, in accordance with some embodiments of the present disclosure. The features discussed in regards to the components and modules of FIG. 3 can be implemented in software logic (e.g., firmware, software, or other program code) or hardware logic (e.g., integrated circuits or other circuitry) of processing device 215B (e.g., memory controller). More or less components or modules can be included without loss of generality. For example, two or more of the components can be combined into a single component, or features of a component can be divided into two or more components. In the example illustrated, memory sub-system 110 can include a request processing component 310, a data structure component 320, a data storing component 340, and a data store 350.

Request processing component 310 can enable memory sub-system 110 to process requests received from host system 120. The requests can be for accessing particular data blocks and involve requests to write data, read data, or a combination thereof. memory sub-system 110 can include a physical host interface for communicating requests and responses with host system 120 (e.g., PCIe) as discussed above in regards to FIG. 1. In the example illustrated by FIG. 3, request processing component 310 can include a write request module 312, a read request module 314, and a response module 316.

Write request module 312 can enable memory sub-system 110 to process write requests that are received from host system 120. The write requests can cause data to be written to and persistently stored by memory sub-system 110. The write requests can be a type of request that was discussed above and can include location data, user data, and metadata. The location data can indicate a source location, destination location, or a combination thereof. In one example, the write request can include data identifying a source location where the user data is (e.g., a location in buffer 224A). In another example, the write request can include the user data as part of the write request. In either example, the write request may or may not include a destination location to store the data and when the destination location is absent it may have been included in a prior write request, in a subsequent write request, or determined by a recipient device and provided back to the host system 120 in a response. The user data can be persistently stored by memory sub-system 110 and the metadata can include data describing the user data.

Relationship data 352 can be a type of metadata that indicates relationships between different portions of the user data. The user data can be stored and transferred as data blocks and the relationship data can indicate which data blocks are part of a group and are therefore related to one another. Data blocks can be related to one another when they are part of the same computing entity. The computing entity can be a storage object (e.g., filesystem object, database object), executable process (e.g., heap, stack), hardware source or destination (e.g., network adapter, graphics card), virtual machine, container, other computing entity, or a combination thereof.

The relationship data can be generated and assigned by host system 120 or memory sub-system 110 and can be included in one or more of the requests. The relationship data can be created for each data block or for a group of related blocks. In one example, a program executed by host system 120 can generate relationship data and provide the relationship data with the data blocks internal or external to a request (e.g., internal to a write request). The program can be associated with a file system, database system, operating system, device driver, application, other program, or a combination thereof. In another example, memory sub-system 110 (e.g., memory controller firmware) can generate or supplement relationship data before, during, or after receiving one or more of the data blocks. In either example, the relationship data can be or include one or more stream identifiers.

A stream identifier can be associated with the Streams Directive provided by the Non-Volatile Memory Express (NVM Express™) specification. The Streams Directive can enable a host system to indicate (i.e., by using the stream identifier) to the memory sub-system 110 that particular data blocks (e.g., group of LBAs) are part of one group of associated data. The stream identifier can be provided in or associated with one or more write requests (e.g., write commands) and used by memory sub-system 110 (e.g., SSD controller) to store related data in associated locations or for other performance enhancements or for endurance improvements. The stream identifier can be a numeric or non-numeric value that is unique to one or more namespaces, zones, memory devices, memory sub-systems 110, host systems 120, or a combination hereof.

A namespace is a quantity of storage space (e.g., non-volatile memory) that can be formatted into logical blocks. The memory sub-system 110 can support multiple namespaces that are referenced using a namespace identifier (e.g., Namespace ID). Namespaces may be created and deleted using the Namespace Management and Namespace Attachment commands. The namespace can correspond to a data structure in the memory sub-system and/or host system. The data structure can indicate capabilities and settings that are specific to a particular namespace or are common to one or more (e.g., all) of the namespaces of memory sub-system 110.

Memory sub-system 110 can provide information about the namespaces or streams to host system 120 in response to a request about a configuration of memory sub-system 110. The response can indicate a stream write size, stream granularity size, stream resource, namespace, other information, or a combination thereof. Memory sub-system 110 can use the stream information to align the user data in multiples of the stream write size (SWS) to provide more optimal performance for processing requests (e.g., write and read commands). The stream granularity size can indicate the size of the memory devices that is prepared as a storage unit for future allocation for write commands and can be a multiple of the stream write size. Memory sub-system 110 can use the stream identifier to allocate and group the data blocks of a stream together.

Read request module 314 can enable memory sub-system 110 to process read requests received from host system 120. A read requests (e.g., request 217) can include data that is used by memory sub-system 110 to identify the one or more data blocks being requested. The one or more data blocks are part of a set of data blocks (e.g., first set) that are therefore explicitly requested by host system 120 and can be related to a second set of one or more blocks that have not been requested by host system 120. The first set of blocks can be retrieved in response to the request and stored in host memory as discussed below in regards to data pull module 342 (e.g., fetched and loaded). The second set of data block can be retrieved in the absence of a request from the host system and can be stored in host memory as discussed below in regards to data push module 344 (e.g., prefetched and preloaded).

Response module 316 can enable memory sub-system 110 to provide a response to one or more read requests. The response can be a message or signal that includes status data (e.g., error message), identification data (e.g. block identifiers), location data (e.g., destination location), other data, or a combination thereof. The response can be transmitted to host system 120 and indicate one or more data blocks of the first set are available to be accessed by the processing device of the host system. The response can indicate one or more of the data blocks have been retrieved. The response can be sent before, during, or after storing the first set of data blocks at a location accessible to processing device of the host system (e.g., location in host memory or processor cache).

Data structure component 320 can enable memory sub-system 110 to create and update one or more data structures for determining and storing data blocks that are related to requested data blocks. In one example, data structure component 320 can include a buffer module 322, a mapping module 324, and a set determination module 326.

Buffer module 322 can enable memory sub-system 110 to establish one or more buffers in host memory of host system 120. Host memory 222 can be organized into many regions and some or all of the regions can initially be controlled by host system 120. Buffer module 322 can enable memory sub-system 110 to communicate with host system 120 to identify at least one region in host memory 222 that will be assigned to memory sub-system 110. The assigned region can be can then be controlled by memory sub-system 110 and host system 120 may or may not have read access and/or write access to the region. The region can include multiple portions and a first portion can include a data structure that stores data blocks (e.g., stream cache) and the second portion can include a data structure that stores mapping information corresponding to the stored data blocks (e.g., mapping table). The term buffer (e.g., buffer 224B) can refer to the entire region and include both data structures or can refer to the first portion of the region that stores the data blocks.

Establishing the buffer in host memory can involve communication between the memory sub-system 110 and host system 120. The communication can include transmitting, by the memory sub-system to the host system, an indication of a size of a region in host memory. In response, the memory sub-system can receive, from the host system, a location of the region in the host memory. Memory sub-system 110 can then update the region to include the one or more data structures for the buffer. In one example, the buffer in host memory that is controlled by memory sub-system 110 can be the same or similar to a host memory buffer.

A host memory buffer (HMB) can be a feature provided by the Non-Volatile Memory Express (NVM Express™) specification. The host memory buffer feature provides a mechanism for host system 120 to allocate and assign a region of host memory for the exclusive use of memory sub-system 110. Once assigned, host system 120 will not write to the Host Memory Descriptor List or to the one or more region in host memory (e.g., regions described by the Host Memory Descriptor List) until the host memory buffer has been freed (e.g., disabled, relinquished) by the memory sub-system 110, host system 120, other system, or a combination thereof.

Mapping module 324 can enable memory sub-system 110 to generate one or more mapping data structures. The technology disclosed herein may use one or more mapping data structures that are stored in memory sub-system 110, in host system 120, or a combination thereof. A mapping data structure stored in memory sub-system 110 can be referred to as device-side mapping data structure (e.g., 354A) and a mapping data structure stored in host memory 222 can be referred to as host-side mapping data structure (e.g., 354B).

Mapping data structure 354A can be used by memory sub-system 110 to store mapping data that is used to determine which data blocks are related to one another. Mapping data structure 354A can be stored in controller memory (e.g., SSD DRAM), memory devices 130 (e.g., NAND), or a combination thereof. Mapping data structure 354A and include mapping data, identification data, relationship data, other data, or a combination thereof. The mapping data can associate (e.g., link, map, correlate) identification data with relationship data. In one example, mapping data structure 354A and its mapping data can be in the form of a table that includes one or more columns with identification data (e.g., LBAs) and one or more columns with relationship data (e.g., Stream IDs).

Mapping data structure 354B can be used by host system 120 to store mapping data that is used to determine which data blocks are stored (e.g. preloaded) into the buffer in host memory (e.g., stored in stream cache). Mapping data structure 354B can be stored in host memory 222 and include mapping data, identification data, location data, other data, or a combination thereof. The mapping data can associate (e.g., link, map, correlate) identification data (e.g., LBAs) with location data (e.g., destination location in buffer). In one example, mapping data structure 354B and mapping data can be in the form of a table that that includes one or more columns with identification data (e.g., LBAs) and one or more columns with location data (e.g., buffer offset, storage length).

Set determination module 326 can enable memory sub-system 110 to determine a set of one or more data blocks that the host system is likely to access. The one or more data blocks in the set can be related to one or more data blocks that have been previously requested by host system 120. The set of data blocks can be referred to as the prefetched set, the preloaded set, precached set, other term, or a combination thereof. In the examples discussed above, one or more data blocks in the set are determined based on one or more data blocks that have been requested by the host system 120. In other example, the set can be determined based on data blocks that one or more other host systems have accessed (e.g., read or written). In either example, set determination module 326 can determine a requested data block is related to each of the one or more data blocks in the set using one or more of the mapping data structures 354A-B discussed above. In one example, the processing device of memory sub-system 110 can access mapping data structure 354A in the memory sub-system and determine based on mapping data structure 354A that the requested data block is related to each of the one or more data blocks. The processing device can add the one or more data blocks to the set.

Data storing component 340 can enable memory sub-system 110 to transmit data blocks to host system 120. Memory sub-system 110 can transmit data blocks by transmitting them to a host memory of host system 120, a processing device of host system 120, other data storage location, or a combination thereof. Memory sub-system can transmit data blocks to host system 120 by using one or more storage operations to store the data in host memory. In one example, data storing component 340 can include a data pull module 342 and a data push module 344.

Data pull module 342 can enable memory sub-system 110 to perform a data pull and transmit a set of one or more data blocks to host system 120 in response to a request by host system 120. As discussed above in regards to data pull 236, the data pull can be initiated by host system 120 and involve transmitting at least one data block from controller memory (e.g., SSD DRAM) to a location in host memory (e.g., Host DRAM). The location in host memory for a data pull can be selected by host system 120 and be a location in a buffer controlled by host system 120 (e.g., buffer 224A functioning as a page cache). For example, the CPU (e.g., DMA controller or MMU) can allocate space in the buffer and provide a location of the space in the request. Data pull module 342 can also communicate with response module 316 to send a response to host system 120. The response can be sent before, during, or after the data pull is initiated or the data pull is completed.

Data push module 344 can enable memory sub-system 110 to perform a data push and transmit a set of one or more data blocks to host system 120 without receiving a request for any of the one or more data blocks from host system 120. As discussed above in regards to data push 238, the data push can be initiated by memory sub-system 110 and involve transmitting at least one data block from controller memory (e.g., SSD DRAM) to the host memory (e.g., host DRAM). The location can be selected by memory sub-system 110 and be a location in a buffer controlled by memory sub-system 110 as opposed to a buffer controlled by host system 120. For example, the memory controller (e.g., SSD controller) can allocate space in the buffer (e.g., buffer 224B with stream cache) and select a location to store the data blocks.

Data push module 344 can also communicate with mapping module 324 to update mapping data structure 354B to indicate to host system 120 that the data block is or will be in host memory. The update can occur before, during, or after the data push is initiated or the data push is completed. This may be particularly advantageous because the host system 120 can use mapping data structure 354B to determine whether a data block has been prefetched and preloaded and therefore available in host memory 222. This may enable the data to be accessed by host system 120 more quickly to requesting it from memory sub-system 110. In one example, host system 120 may avoid sending requests to or receiving responses from memory sub-system 110 for the data blocks that are preloaded. In another example, host system 120 may send a request for one or more of the preloaded data blocks for data storage management purposes (e.g., data tracking and performance) but may or may not wait for the response.

Figure 4:
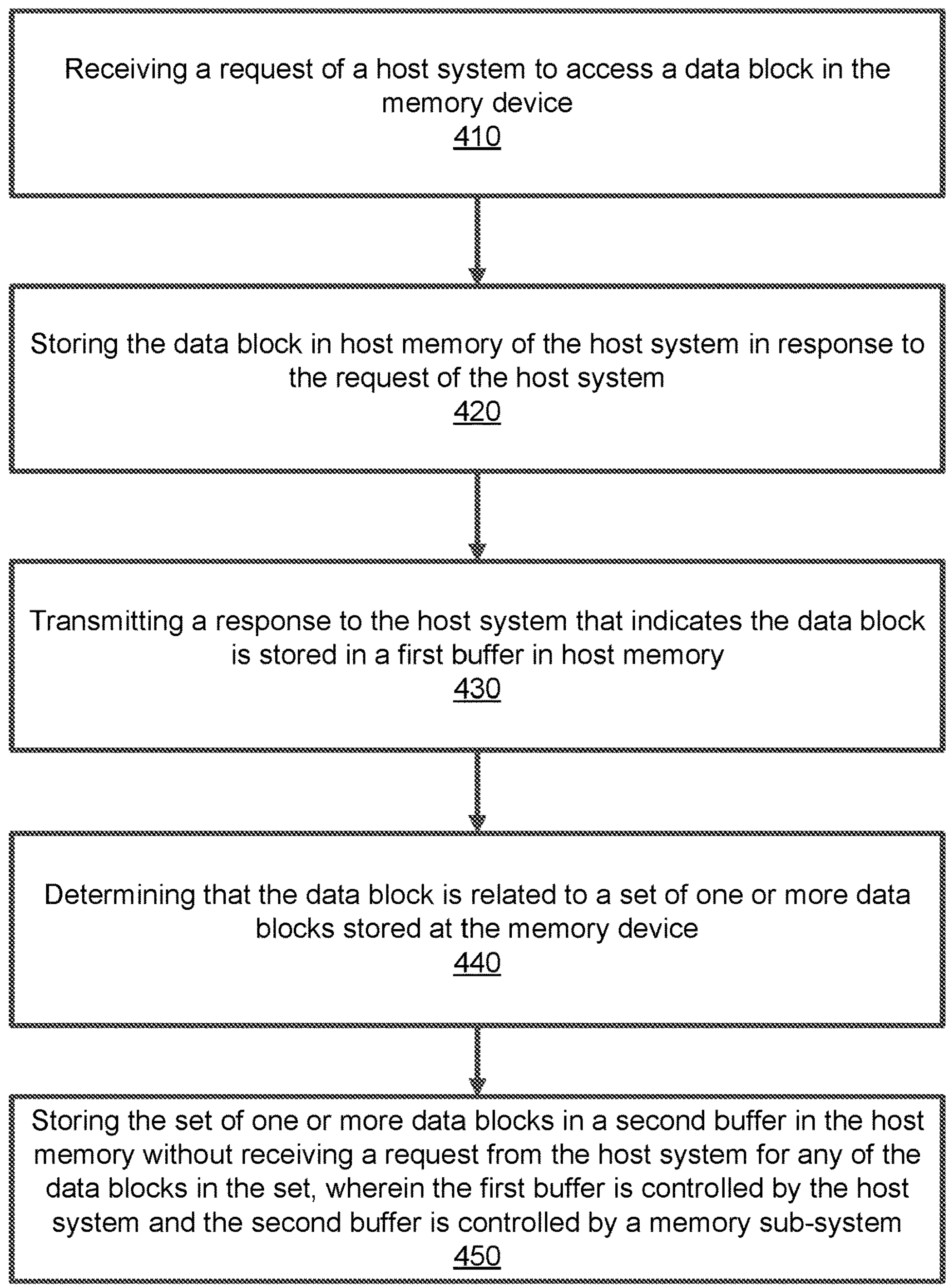
FIG. 4 is a flow chart of a method for prefetching data blocks and loading them into host memory, in accordance with some embodiments of the present disclosure.

FIG. 4 is a flow chart of a method 400 for prefetching data blocks and loading them into host memory, in accordance with an example embodiment. Method 400 can be performed by processing logic that can include hardware (e.g., processing device, circuitry, dedicated logic, programmable logic, microcode, hardware of a device, integrated circuit, etc.), software (e.g., instructions run or executed by a processing device), or a combination thereof. In some embodiments, the method 400 is performed by memory sub-system 110 of FIGS. 1-3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic can receive a request of a host system to access a data block in the memory device. The request of a host system, such as host system 120, can be any request initiated by or generated by the host system and can be received over an interconnect (e.g., bus) from the processing device of the host system, such as processing device 215A, from memory of the host system (e.g,. queue or buffer in processor cache or primary storage), from memory of the memory sub-system (e.g, queue or buffer in secondary storage), other location, or a combination thereof. In one example, the processing logic can be provided by a memory controller included in a farther level of a storage hierarchy that functions as secondary storage (e.g., SSD device).

At operation 420, the processing logic can store the data block in host memory of the host system in response to the request of the host system. Storing the data block in host memory can involve one or more data storage operations that involve transmitting data from a source location to a destination location and can include one or more operations to read, write, load, store, persist, move, copy, format, encode, decode, encrypt, decrypt, other operation, or a combination thereof. The processing logic can transmit the data block from controller memory to the host memory. In one example, the store can use Direct Memory Access (DMA) to directly transmit the data block to the host memory without transmitting the data block through the CPU of the host system.

At operation 430, the processing logic can transmit a response to the host system that indicates the requested data block is stored in a first buffer in host memory. The host memory can include multiple buffers and the first buffer, such as buffer 224A, can function as a page cache that is controlled (e.g. managed) by the host system and a second buffer, such as buffer 224B, can be a Host Memory Buffer (HMB) that is exclusively controlled (e.g. managed) by the memory sub-system. In one example, the processing logic can be part of a Solid State Drive (SSD) that comprises a processing device, RAM, and NAND. The processing logic of the SSD can prefetch a quantity of data from the NAND that exceeds the quantity (e.g, size, space, or capacity) of the RAM by storing the prefetched data in the second buffer in the host memory.

At operation 440, the processing logic can determine that the data block is related to a set of one or more data blocks stored at the memory device. Determining the data block is related to the set of one or more data blocks can involve accessing a data structure and determining that the data block is related to each of the one or more data blocks in the set based on the data structure. The data structure can include mapping data for location identifiers (e.g., location data or identification data) and stream identifiers (e.g., relationship data). The location identifier can be or include a Logical Block Address (LBA) and the stream identifier can be or include a NVM Express Stream ID. In one example, the processing logic can receive one or more write requests with the data blocks and each of the write requests can include a particular stream identifier. The processing logic can update the data structure stored by the memory sub-system to indicate the data blocks are related to the particular stream identifier.

At operation 450, the processing logic can store the set of one or more data blocks in a second buffer in the host memory without receiving a request from the host system for any of the data blocks in the set. The first buffer can be controlled by the host system and the second buffer can be controlled by the memory sub-system. The processing logic can establish the second buffer in the host memory by transmitting a size of a region and receiving from the host system a location of the region in the host memory. The operations can further update the region to be capable of storing data blocks and to include a data structure indicating the data blocks stored in the second buffer (e.g., mapping data structure 354B). In on example, the processing logic can transmit the requested data block to the host memory (e.g., first buffer 224A) responsive to receiving the request for the data block and can transmit a set of one or more related data blocks to the host memory (e.g., second buffer 224B) without receiving a request for any of the related data blocks.

Figure 5:
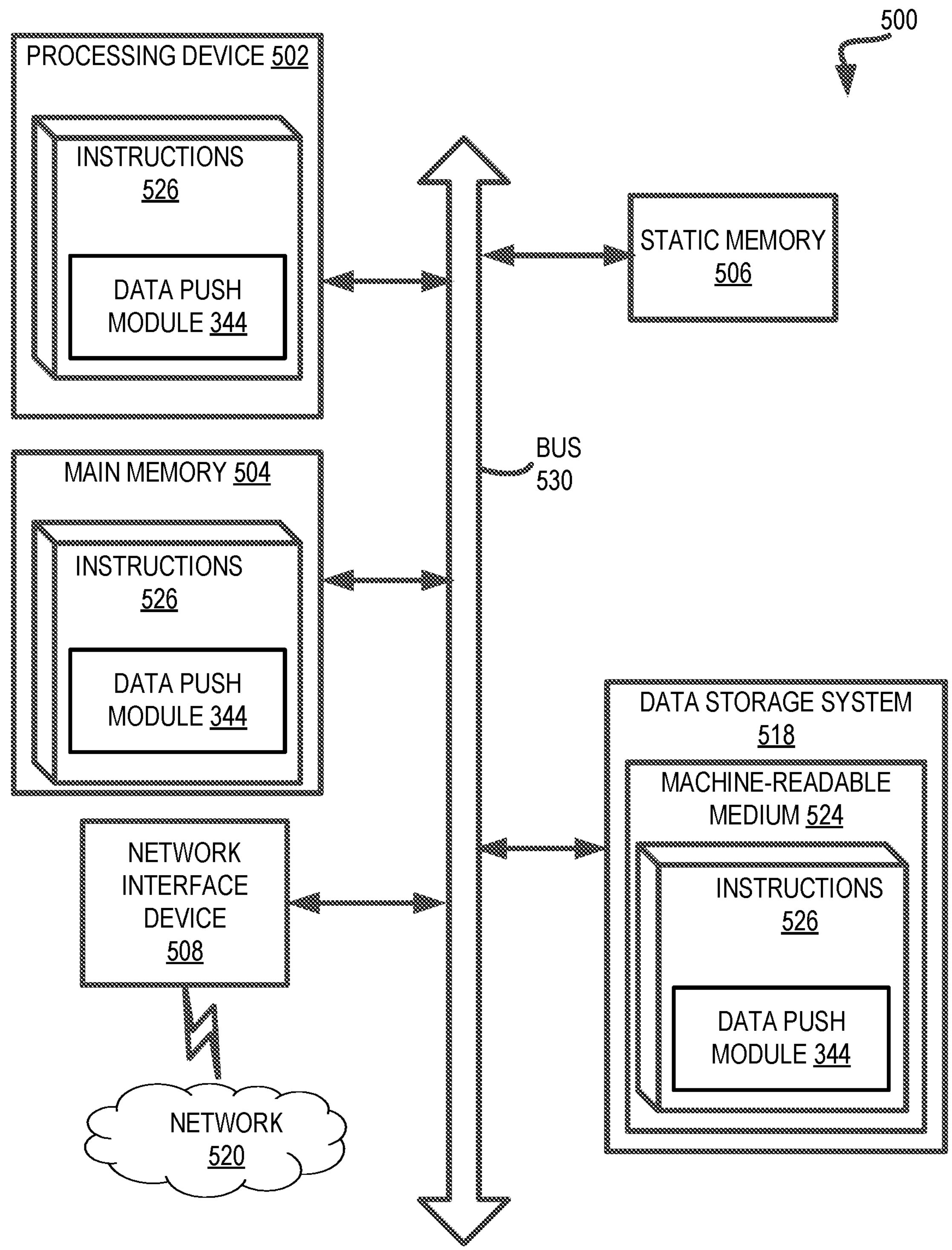
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a memory controller (e.g., the memory controller of FIGS. 1-2) that includes, is coupled to, or utilizes a memory sub-system (e.g., memory sub-system 110 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a non-transitory computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to the data push module 344 of FIG. 3. While the machine-readable storage medium 524 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device operatively coupled to the memory device, to perform operations comprising:
receiving a request of a host system to access a data block in the memory device;
determining that the data block stored in a first buffer in a host memory is related to a set of one or more data blocks stored at the memory device; and
storing the set of one or more data blocks in a second buffer in the host memory,
wherein the first buffer is controlled by the host system and the second buffer is controlled by a memory sub-system.

2. The system of claim 1, wherein the processing device is a memory controller of the memory sub-system and wherein the first buffer comprises a page cache that is managed by the host system, and wherein the second buffer in the host memory comprises a Host Memory Buffer (HMB) that is exclusively controlled by the memory controller.

3. The system of claim 1, wherein the operations further comprise establishing the second buffer in the host memory, wherein the establishing comprises:
transmitting, by the memory sub-system to the host system, an indication of a size of a region in the host memory;
receiving, by the memory sub-system from the host system, a location of the region in the host memory; and
updating the region to comprise the second buffer to store data blocks and to comprise a data structure indicating the data blocks stored in the second buffer.

4. The system of claim 1, wherein the operations further comprise transmitting the data block to the host memory responsive to receiving the request to access the data block, and transmitting the set of one or more data blocks to the host memory without receiving a request from the host system for any of the one or more data blocks.

5. The system of claim 1, wherein the processing device is included in a first level of a storage hierarchy that comprises secondary storage and prefetches data of the set and pushes the data of the set to a second level of the storage hierarchy that comprises the host memory as primary storage.

6. The system of claim 1, wherein the memory sub-system comprises a Solid State Drive (SSD) that comprises the processing device, RAM, and NAND, and wherein the processing device of the SSD prefetches a quantity of data from the NAND that exceeds a capacity of the RAM and stores the prefetched data in the second buffer in the host memory.

7. The system of claim 1, wherein the operations further comprise:
receiving a plurality of write requests for the data block and at least one data block of the set, wherein each of the plurality of write requests comprise a particular stream identifier; and
updating a data structure stored by the memory sub-system to indicate the data block and the at least one data block of the set are related to the particular stream identifier.

8. The system of claim 1, wherein determining the data block is related to the set of one or more data blocks comprises:
accessing a data structure in the memory sub-system that comprises mapping data corresponding to location identifiers and stream identifiers, wherein the location identifiers comprise a Logical Block Address (LBA); and
determining, based on the data structure, that the data block is related to each of the one or more data blocks in the set.

9. The system of claim 1, wherein the operations further comprise:
transmitting, to the host system, a response indicating that the data block is stored in the first buffer in the host memory.

10. A method comprising:
receiving a request to access a data block in a memory device from a host system;
determining that the data block stored in a first buffer in a host memory is related to a set of one or more data blocks stored at the memory device; and
storing the set of one or more data blocks in a second buffer in the host memory, wherein the first buffer is controlled by the host system and the second buffer is controlled by a memory sub-system.

11. The method of claim 10, wherein the method is performed by a processing device that is a memory controller of the memory sub-system and wherein the first buffer comprises a page cache that is managed by the host system, and wherein the second buffer in the host memory comprises a Host Memory Buffer (HMB) that is exclusively controlled by the memory controller.

12. The method of claim 10, further comprising establishing the second buffer in the host memory, wherein the establishing comprises:
transmitting, by the memory sub-system to the host system, an indication of a size of a region in host memory;
receiving, by the memory sub-system from the host system, a location of the region in the host memory; and
updating the region to comprise the second buffer to store data blocks and to comprise a data structure indicating the data blocks stored in the second buffer.

13. The method of claim 10, further comprising:

transmitting the data block to the host memory responsive to receiving the request to access the data block; and transmitting the set of one or more data blocks to the host memory without receiving a request from the host system for any of the one or more data blocks.

14. The method of claim 10, wherein the memory sub-system comprises a Solid State Drive (SSD) that comprises the processing device, RAM, and NAND, and wherein the processing device of the SSD prefetches a quantity of data from the NAND that exceeds a capacity of the RAM and stores the prefetched data in the second buffer in the host memory.

15. The method of claim 10, further comprising:

receiving a plurality of write requests for the data block and at least one data block of the set, wherein each of the plurality of write requests comprise a particular stream identifier; and updating a data structure stored by the memory sub-system to indicate the data block and the at least one data block of the set are related to the particular stream identifier.

16. The method of claim 10, wherein determining the data block is related to the set of one or more data blocks comprises:

accessing a data structure in the memory sub-system that comprises mapping data corresponding to location identifiers and stream identifiers, wherein the location identifiers comprise a Logical Block Address (LBA); and determining, based on the data structure, that the data block is related to each of the one or more data blocks in the set.

17. A non-transitory computer readable medium including instructions, which when performed by a computer system comprising a memory device, and a processing device operatively coupled to the memory device, cause the computer system to perform operations comprising:

receiving a request to access a data block in the memory device from a host system;

determining that the data block stored in a first buffer in a host memory is related to a set of one or more data blocks stored at the memory device; and storing the set of one or more data blocks in a second buffer in the host memory, wherein the first buffer is controlled by the host system and the second buffer is controlled by a memory sub-system.

18. The non-transitory computer readable medium of claim 17, wherein the processing device is a memory controller of the memory sub-system and wherein the first buffer comprises a page cache that is managed by the host system, and wherein the second buffer in the host memory comprises a Host Memory Buffer (HMB) that is exclusively controlled by the memory controller.

19. The non-transitory computer readable medium of claim 17, wherein the operations further comprise transmitting the data block to the host memory responsive to receiving the request to access the data block, and transmitting the set of one or more data blocks to the host memory without receiving a request from the host system for any of the one or more data blocks.

20. The non-transitory computer readable medium of claim 17, wherein the processing device is included in a first level of a storage hierarchy that comprises secondary storage and prefetches data of the set and pushes the data of the set to a second level of the storage hierarchy that comprises the host memory as primary storage.

* * * * *